United States Patent [19]

Roberts

[11] 3,751,150

[45] Aug. 7, 1973

[54] AUDIO-VISUAL APPARATUS

[75] Inventor: Richard W. Roberts, Lombard, Ill.

[73] Assignee: Borg-Warner Corporation, Chicago, Ill.

[22] Filed: June 21, 1966

[21] Appl. No.: 559,247

[52] U.S. Cl. .......................... 353/7, 353/16, 353/19, 352/19, 40/28.1

[51] Int. Cl. .......................................... G03b 21/00

[58] Field of Search ......................... 88/28 CS, 27 C; 352/19, 20; 40/28.1; 353/15, 16, 17, 18, 19, 120

[56] References Cited

UNITED STATES PATENTS

| | | | |
|---|---|---|---|
| 1,404,194 | 1/1922 | Emerson & Wheelan | 88/27 C |
| 2,618,197 | 11/1952 | Boushey | 88/27 C |
| 2,683,390 | 7/1954 | Steele | 88/28 CS |
| 2,847,905 | 8/1958 | Novak | 88/28 CS |
| 3,048,083 | 8/1962 | Rosenbaum | 88/27 C |
| 3,078,762 | 2/1963 | Greenaway | 88/27 C |
| 3,124,034 | 3/1964 | Edhouse | 88/27 A |
| 3,256,775 | 6/1966 | Hall | 88/28 CS |
| 3,357,303 | 12/1967 | Staar | 88/28 CS |

*Primary Examiner*—Samuel S. Matthews
*Assistant Examiner*—Richard M. Sheer
*Attorney*—Donald W. Banner, Lyle S. Motley, C. G. Stallings and William S. McCurry

[57] ABSTRACT

An audio-visual system utilizing an integrated audio and visual program unit, the latter including a record disc and a disc carrying projectable transparencies. The disc carrying images is either formed with or connected to a cam which is adapted to cooperate with the cam follower controlling the position of the audio pick-up. For each position of the image disc, there is a unique position of the audio pick-up relative to the record disc thereby assuring precise synchronization.

8 Claims, 19 Drawing Figures

INVENTOR
RICHARD W. ROBERTS
BY Thomas B. Hunter
ATTORNEY

Fig 14
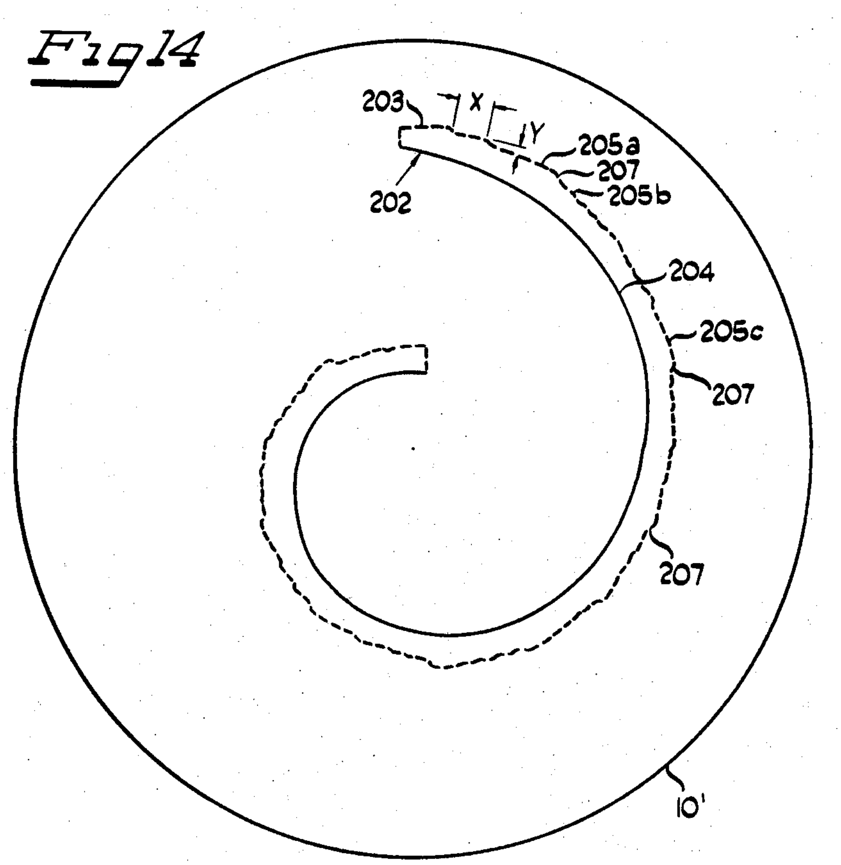
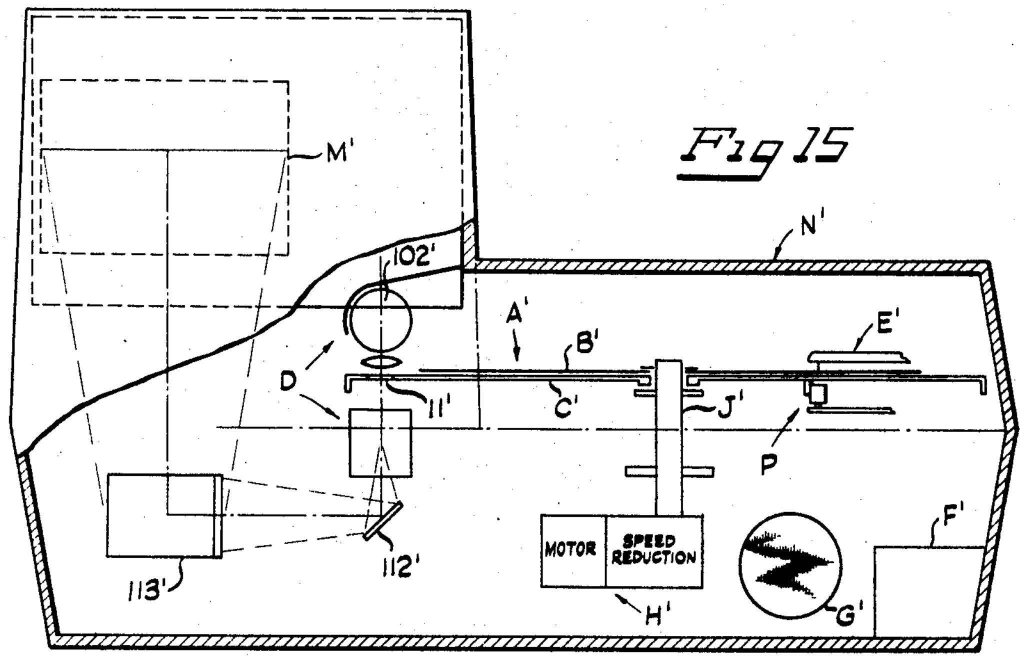

AUDIO-VISUAL APPARATUS

BACKGROUND AND SUMMARY OF THE INVENTION

This invention relates generally to audio-visualsystems which are particularly adapted for use in educational, advertising, or entertainment apparatus; and it is more particularly concerned with apparatus having synchronized audio and visual components wherein a recorded message is reproduced to correspond with a particular visual image projected or otherwise displayed.

One of the principal disadvantages of most prior art apparatus of the type to which the present invention pertains is that the audio and visual components are physically disassociated so they must be handled and placed in their operative positions independently, rather than being handled as a unit. While some of such systems are capable of having the audio and images synchronized once both components are arranged in their correct initial operating position, separate handling of the two components often makes it difficult for the operator to assure that they are in initial synchronization. This is particularly true when such a device is designed to be operated by small children.

Devices which contain both the audio and the visual components on the same medium, for example, a film strip with an optical or magnetic audio recording along the edge, are objectionable for other reasons. First of all, this particular approach does not lend itself to the storage of relatively large amounts of audio information because the audio tracks(s) are normally rectilinear; and, therefore, a long length of film strip must be utilized to record even a relatively short message.

There are a few showings in the prior art of integrated program units containing both audio and visual components which are mechanically associated to provide a compact, easily handled, information storage element. For example in U.S. Pat. No. 2,847,905, issued to W. D. Novak on August 19, 1958, there is shown a combination audio-visual program unit in which a plurality of images are arranged in a circular pattern on an annular image support member which surrounds and engages an audio disc disposed centrally of theimage support member. There is, however, no means for insuring absolute synchronization between the projection of a particular image and a recorded message corresponding thereto. Synchronization depends entirely upon proper positioning of the program unit to begin the program such that a particular image is displayed long enough to play out the recorded message. A similar program unit is disclosed in U.S. Pat. No. 2,683,390, issued to D. C. Steele on July 13, 1954. The sound reproducer and iamge projector combination described in Steele provides synchronization by driving an image advancing mechanism through the rotation of the turntable carrying the audio record. There is, however, no means to assure that the pickup is properly located on the record for any particular image displayed. In other words, if the unit is not in initial synchronization, or if position of the audio pickup is disturbed at any time durign the program, synchronization between the audio and visual components will be lost.

The present invention pertains to systems wherein an integrated audio and visual program unit can be employed in an absolutely synchronized audio-visual device. Since the audio and visual components of theprogram are physically connected to each other, a mismatch between said components is impossible. The program units described herein are also adapted to carry a large number of separate frames of visual information and a correspondingly large amount of audio information in a relatively small unit which can be easily handled and stored, and which facilitates insertion and removal from the audio-visual apparatus.

It is, therefore, a principal object of the invention to provide an audio-visual system which is simple in construction and operation, and permits the use of an integrated audio and visual program unit. Another feature of the invention is to provide apparatus which permits through-projection of transparencies, even though the audio portion of the program is carried on an opaque element normally overlying the transparencies. Another object of the invention is to provide an audio-visual system such that the audio and visual components thereof are fully synchronized during operation and the reproduction of an audio message cannot be played in conjunction with the wrong visual image or frame. Additional objects and advantages will be apparent from reading the following detailed description taken in conjunction with the drawings.

DESCRIPTION OF THE DRAWINGS

FIG. 14 is a detailed plan view of the audio pickup positioning cam associated with the image disc;

FIG. 15 is a cross-sectional view illustrating the relative location of the various components in the embodiment shown in FIGS. 12 and 14;

DETAILED DESCRIPTION OF THE INVENTION

Figure 2:
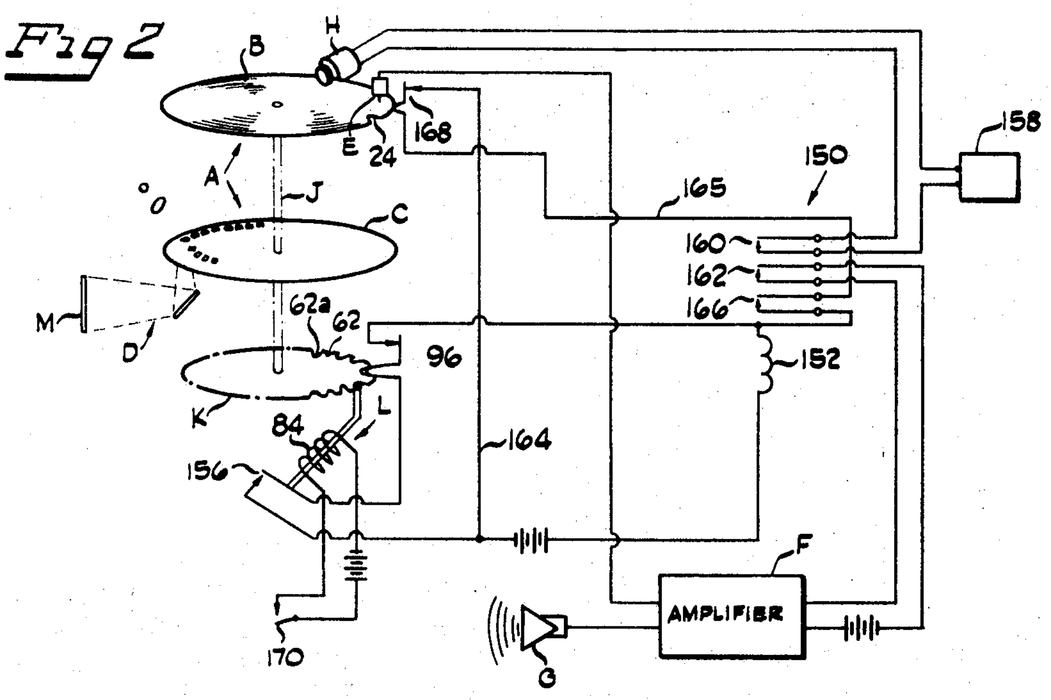
FIG. 2 is a schematic diagram showing the electrical circuit for controlling the operation of the various components.

Before proceeding to a more detailed description of the invention, it would be advisable to provide a glossary for various terms used frequently throughout the specification and claims herein. It should be understood that this is primarily for the purpose of facilitating a complete understanding of the invention, and it is not intended that the terms be strictly limited to the specific definitions recited.

PROGRAM

Any intelligence, regardless of the purpose for which such intelligence is to be employed, e.g. educational, instructional, or entertainment, for communication to the operator, said intelligence being capable of being divided into a predetermined number of discrete segments for presentation to the operator in a non-random fashion. The term "discrete segments" is not to be limited to a single visual image presented in conjunction with a single audio message, but may also include more than one audio message corresponding to a single visual image or more than one visual image corresponding to a single audio message.

VISUAL SYSTEM

The combination of the visual component of theprogram unit and means for projecting or otherwise displaying a discrete image for viewing by the operator.

IMAGE

Any pictorial representation, symbol, written matter, alone or in combination with each other, for communicating intelligence to the operator through his visual senses.

AUDIO SYSTEM

The audio component of the program unit and the audio reproduction unit.

PROGRAM UNIT ADVANCE MECHANISM

Any menas for advancing or changing the image, symbol, or written material displayed. This may be done by either moving the support on which the image is carried or by means of an optical system for projecting different images from a stationary support.

PROGRAM UNIT

A completely integrated unit for storing both audio and visual intelligence or information com prising the entire, or a portion of, audio-visual program to be presented to the operator. The program unit consists of an audio component and a visual component defined below.

AUDIO COMPONENT OF PROGRAM UNIT

Any suitable medium for recording one or more messages by any means, such as optical, magentic, or embossed recording techniques. The audio messages may be recorded directly on the medium, such as a record, or on a separate element attached to a support.

AUDIO MESSAGE

The audio message is any information which is capable of being reproduced by an appropriate audio reproduction system including a pickup.

VISUAL COMPONENT OF PROGRAM UNIT

The combination of a plurality of discrete images adapted to be selectively presented to the operator and means for supporting the images in a predetermined pattern.

AUDIO REPRODUCTION SYSTEM

Any means which is adapted to cooperate with the audio component of theprogram unit to convert the recorded messages into intelligence capable of bieng understood by the operator through his aural senses. In a conventional system, this would include an audio pickup of the type corresponding to the particular form of the recorded audio information; an amplifier to convert the signal generated by the pickup to an alternating frequency of sufficient power to actuate a transducer, such as a loudspeaker to convert the amplified signal to an audible signal. This would also include simple mechanical systems for direct conversion of the recorded information into sound, e.g. a diaphragm mechanically connected to a record stylus.

Figure 1:
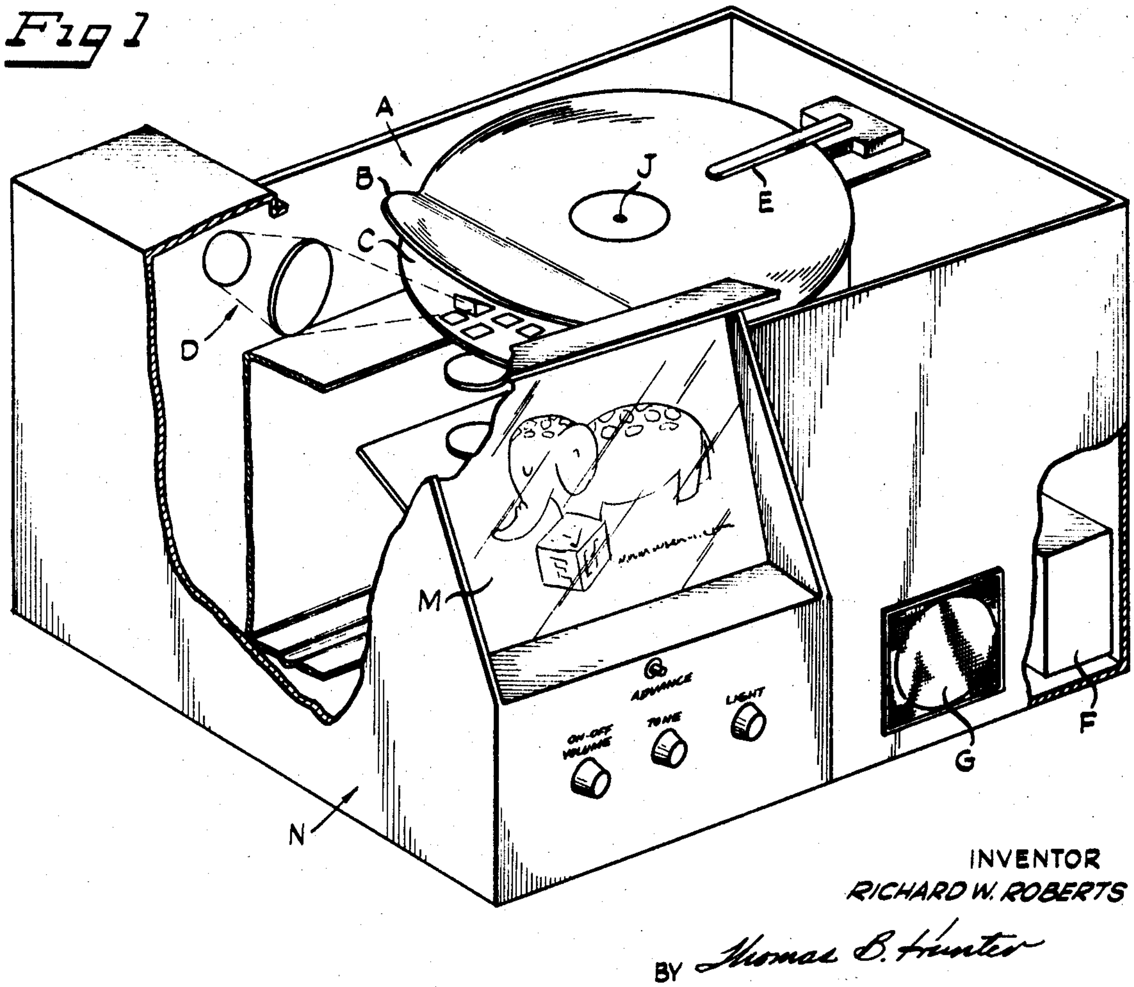
FIG. 1 is an isometric illustration, with portions of thehousing broken away, of a preferred embodiment of thepresent invention.

In general, FIGS. 1 and 2 show the audio-visual system to illustrate the functional organization of the various components. The program unit A, which may be boradly characterized as an audio and visual information storage element, includes an audio component B comprising a disc having recorded information thereon in the form of a series of concentric audio tracks; and a visual component C in the form of a separate disc adapted to be secured to the audio component B, but capable of independent relative rotation with respect thereto. The visual component C, in a preferred embodiment, contains a series of discrete images, such as film transparencies, supported by a disc so that the images are arranged in a generally spiral pattern.

An optical projection system D is provided for displaying the images associated with the visual component; and an audio reproduction system, including an audio pickup E, an amplifier F. and a loudspeaker G, is operative to play back a recorded message to correspond to a particular iamge displayed when the audio disc is driven by a motor or other suitable drive means H.

In one embodiment of the present invention, the program unit A is supported on a movablespindle J to which is attached a combination indexing wheel and cam K to effect both lateral and rotative movement of the spindle when the indexing wheel is actuated by a program advance or indexing mechanism L. Since the image disc is secured to the spindle, each time the spindle is rotated, a different image is brought into alignment with the optical system and projected onto a display screen M on the front of the housing N. When the spindle is both rotated and moved laterally, an image which is not only circumferentially spaced from the previous image, but also located at different radial distance from the axis, is brought into alignment with the optical system. When the spindle is laterally displaced as described above, the audio disc is also moved relative to the stationary audio pickup to bring the pickup into operative relationship with an audio groove radially displaced from the audio groove carrying the previous audio message.

THE PROGRAM UNIT

Figures 3, 4, 5:
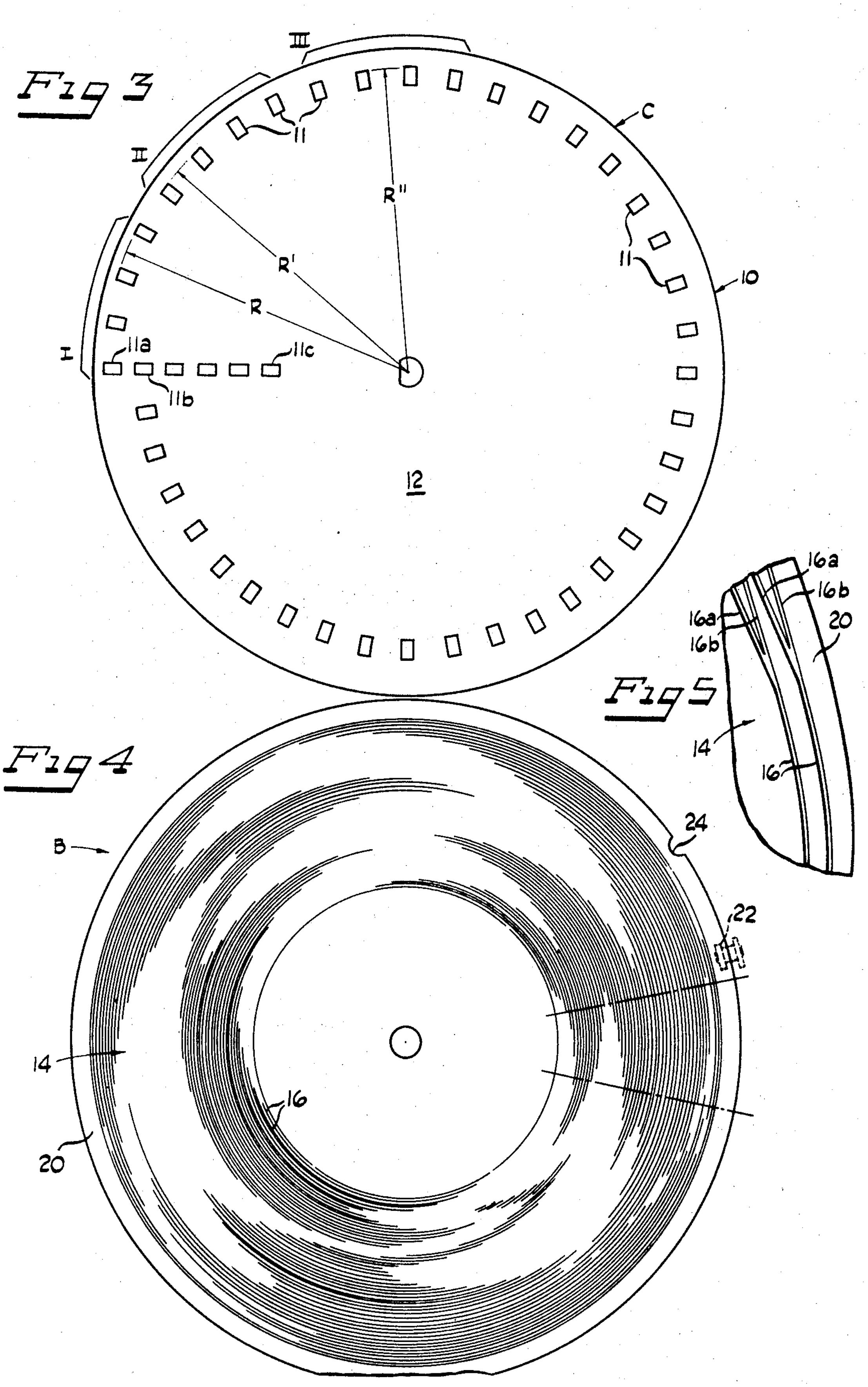
FIG. 3 is a bottom plan view of the visual component of the program unit.
FIG. 4 is a top plan view of the audio component of the program unit.
FIG. 5 is a detailed plan view, greatly exaggerated, of a portion of the audio disc.

In order to fully understand the operation of the audio-visual mechanism, it would be advantageous to first describe a preferred program unit which is adapted for use therewith. As shown in FIG. 3, the visual component B is in the form of an image disc 10 having a plurality of images 11 arranged in a generally spiral pattern and supported by a circular disc 12 of thin, thermoplastic sheet or other suitable material. The iamge identified at 11*a* is located at the maximum radial distance from the axis of rotation; and the generally spiral configuration is provided by locating successive images or groups of images at ever decreasing radial distances from the first image 11a.

In most cases, it is unnecessary to provide a separate audio message for each image so that in a preferred embodiment, the images may be arranged in groups with every image in a particular group being located at the same radial distance from the axis of rotation. In the example shown, the images are arranged in groups of four with the first group of four images, designated by Iand beginning with image 11a, spaCed from the axis by a radial distance between R, R', R'', etc. is such that at the end of one revolution, the image disc and spindle will have advanced by a distance equal to the radial spacing between image 11a and image 11*b*. This configuration is repeated until the last image in the program 11*c* is brought into alignment with the projection system.

In a program unit of practical size, the diameter of the disc would be approximately eight inches. The image size is chosen so that 40 individual images can be accommodated for each revolution by spaciang them about 9° apart. Using five complete revolutions of the image disc to complete the program, 200 separate images may be carried in each program unit.

The audio component B comprises a thin flexible disc 14, preferably fabricated of vinyl resin, or other suitable material, that has a plurality of messages recorded in a plurality of concentric grooves 16 formed by embossing from a master record in a manner well understood by those skilled in the art. When the disc is rotated at a constant speed for one revolution, an audio message corresponding to the particular image will be played back to the operator. At a playback speed of 16-2/3 r.p.m., each audio message will last approximately four seconds. While advanced recording techniques may make it feasible to provide a separate message for each image in the two inch band of recording provided, it is not necessary (and in some cases may not even be desirable) to have a message corresponding to each image. It is obvious that the closer together the grooves are, the more precision is required to lcoate the pickup properly; and fewer messages permit more space between the grooves and less chance of losing synchronization with the visual component. In one preferred embodiment, the audio disc is provided with one message for every four images, i.e. 50 messages. It is apparent that for each group of images the audio message may be played back for any given image. However, since thee means for controlling the reproduction of an audio message is linked with the image disc, a message will have to correspond with all of the images arranged along any given radius.

As shown in FIG. 5, audio tracks 16 on record disc 18 are concentric with respect to each other and are preferably provided with lead-in grooves 16*a*, 16*b* extending for about ⅛ – ¼ of a revolution in an area just ahead of thepoint where the stylus engages the recorded portion of the audio track. If the record grooves are formed such that the center-to-center (radial) spacing is about 0.04 inch, the leadin grooves can extend about 0.015 inch on both sides to form a band 0.03 inch wide where the stylus can be dropped and still pick up the proper groove. This provides the tolerance necessary to position the stylus in its proper position and reproduce the correct audio message corresponding to the image displayed.

The diameter of the audio disc 14 is slightly greater than the diameter of the image disc 10. This provides a marginal area 20 which is adapted to be engaged by a friction drive roller 22 to rotate the audio disc at a constant speed for playback. The notch 24, shown on the edge of the audio disc is used to actuate a switch for the motor drive circuit. The operation of this switch will be described in more detail below.

Figures 6, 7, 8:
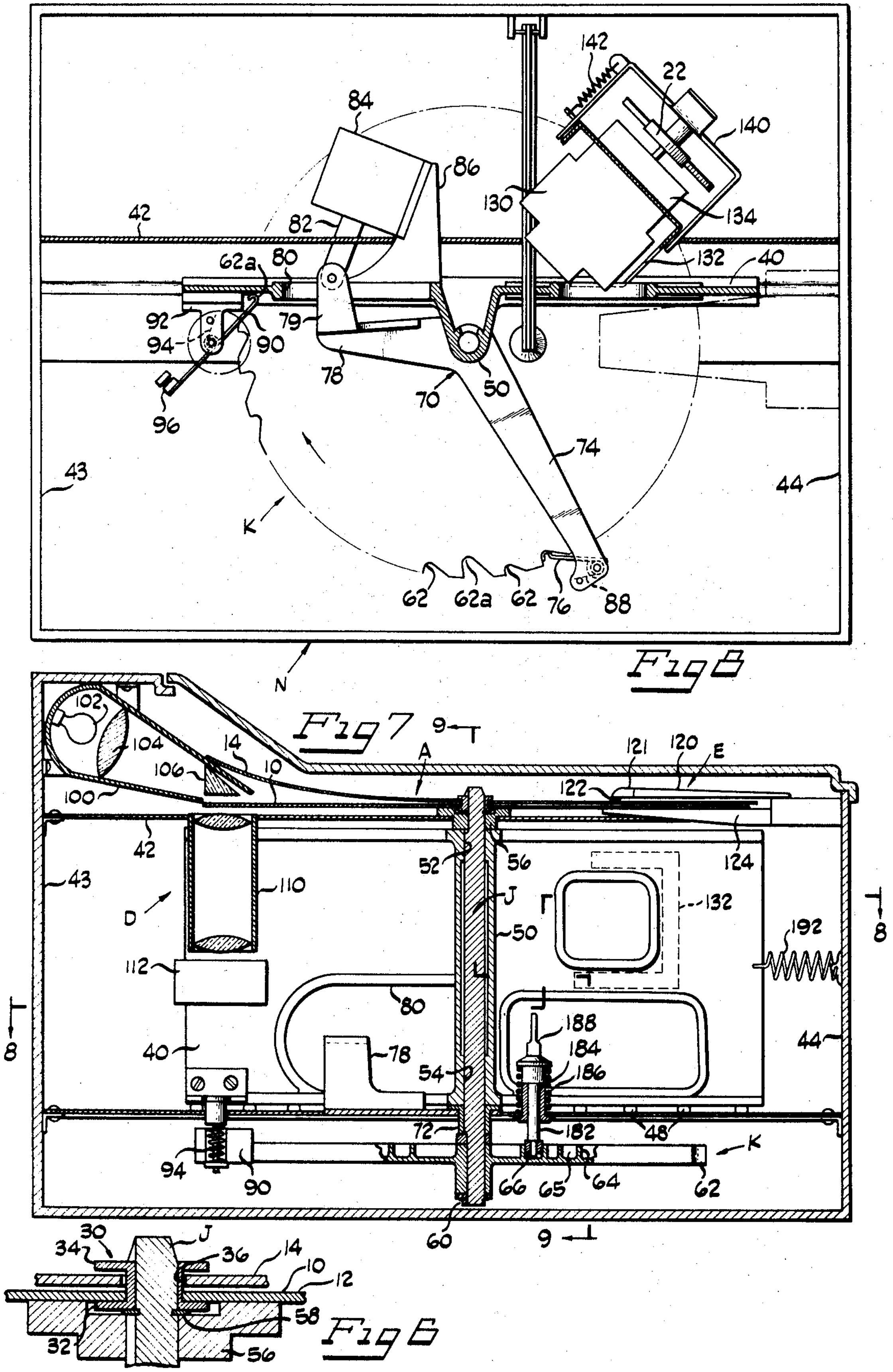
FIG. 6 is a detailed cross-sectional view of the central portion of theprogram unit illustrating the manner in which the audio and visual components are secured together and supported on the spindle.
FIG. 7 is a cross-sectional view of an audio-visual device constructed in accordance with the principles of the present invention.
FIG. 8 is a cross-sectional view taken along the plane of line 8—8 of FIG. 7.

The manner in which the audio disc and the image disc are fastened together is best illustrated in FIG. 6. The iamge disc 10 is rigidly attached to a bushing 30 which has a lower, radially extending flange 32 and an upper, radially extending flange 34. The audio disc 16 is held between the image disc and the radially extending flange, but the central opening 36 in the audio disc is sufficiently large to allow the audio disc to freely rotate on the bearing surface provided by the bushing relative to the iamge disc. The bushing is splined or otherwise secured to the upper end of the spindle J. so that when the spindle is rotated, it rotates the image disc along with it.

Figure 9:
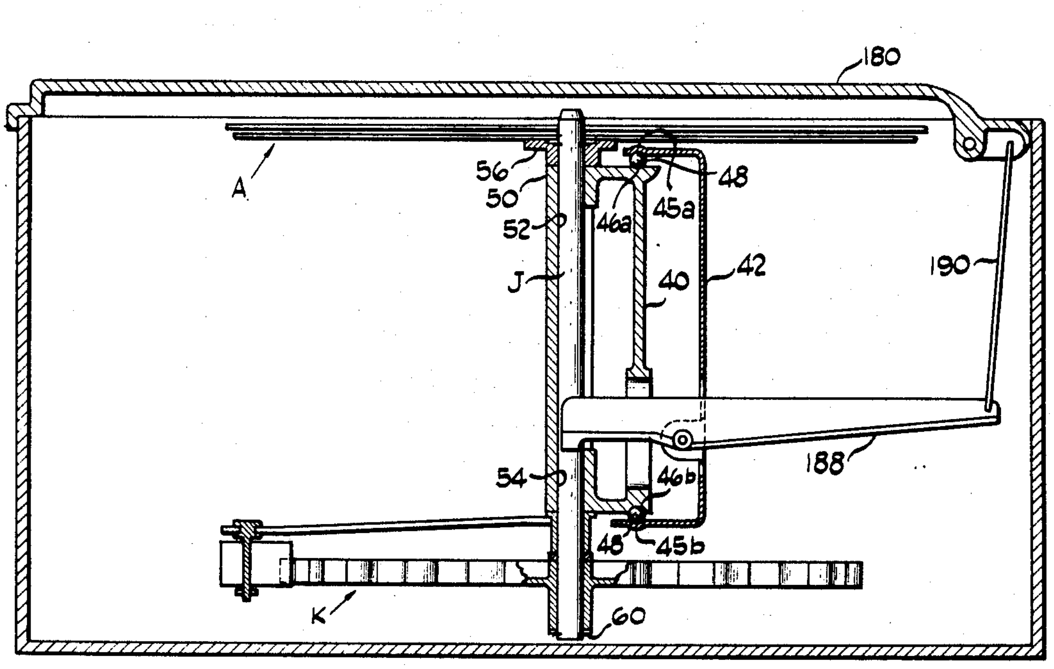
FIG. 9 is a cross-sectional view taken along the plane of line 9—9 of FIG. 7.

Referring now in more detail to FIGS. 7 to 10, the program unit A is arranged to travel back and forth along a predetermined path relative to the fixed audio pickup E and the stationary optical projection system D. The spindle J supporting the program unit is held by a carriage 40 mounted for limited rectilinear movement on a bracket 42 secured to the side walls 43 and 44 of housing N. As best shown in FIG. 9, the bracket 42 has a generally channel shaped cross-section to provide upper and lower laterally extending portions which are provided with upper and lower tracks 45*a* and 45*b* in which the carriage moves. The carriage 40 may be conveniently formed as an integral casting and includes straight upper and lower edges provided with complementary grooves 46*a*, 46*b*. Ball bearings 48 are interposed in the tracks between the carriage and the bracket to facilitate sliding movement therebetween. The spindle J is carried by a spindle support 50 projecting from one side of the carriage and extends through bearing sections 52, 54 at opposite ends of the spindle support, the intermediate portion of said support being open on one side. A collar 56 (FIG. 6) is secured to the upper end of spindle J by means of a retainer 58 which holds the spindle in a fixed position relative to its support, the upper annular surface of collar 56 also serving as a supporting surface for program unit A by engagement with the radially inner portion of image disc 10.

A combination indexing wheel and cam track K (hereinafter simply referred to as the cam wheel) is secured to the lower end of the spindle J and held in position by a retainer 60. The periphery of the cam wheel K is provided with a plurality of circumferentially spaced notches 62 and 62*a*, the latter having a greater depth than notches 62. The upper surface of cam wheel K is formed with a generally spiral rib 64 to constitute a cam track 65 between juxtaposed surfaces thereof. The configuration of the cam track is not a true spiral, but is in the form of a plurality of discrete arcuate segments of constant radii spaced from the rotational axis at ever decreasing radii from the radially outermost segment to the radially innermost segment, said track having interconnecting portions between adjacent segments. Thus, the overall pattern of the cam track may be considered as a stepped spiral.

The cam track 65 controls the lateral movement of the carriage by cooperating with a stationary cam follower 66 supported by bracket 42. It should be noted that in this embodiment, and in the embodiments shown in FIGS. 26 yo 18, the cam and its associated follower constitute positioning means responsive to the position of the visual component for moving the audio pick-up relative to the phonograph record. In all cases, the synchronized movement between the audio and the visual components is positive and irreversible in the sense that movement of the visual component will effect a change in the position of the pick-up relative to the phonograph record, but not vice-versa. The constant radius arcuate segments permit the cam wheel and image disc to be rotated without producing relative (radial) movement between the audio pickup and the audio disc. However, when the cam wheel is rotated to a position wherein the cam follower engages an arcuate segment which is spaced radially iwnardly (or outwardly) from the adjacent segment, the cam follower moves along the interconnecting portion; and, as the follower begins to move into the next segment, the carriage will be forced to move laterally to bring the next group of images into radial alignment with the optical system and also positioning the audio pickup in an adjacent record track.

Means for intermittently advancing the cam wheel K, best shown in FIGS. 8 and 9, comprises a generally L-shaped lever 70 mounted for pivotal movement by means of a sleeve 72 journalled on the spindle J below the lower bearing section. One arm 74 of lever 70 carries a drive pawl 76 engageable with the notches 62 on the periphery of the cam wheel. The other arm 78 has an offset portion 79 which extends through an opening 80 in the carriage and is connected to an actuating link 82 of a solenoid 84 supported on an extension 86 of the carriage. Drive pawl 76 is biased inwardly against the periphery of the wheel by means of a spring 88. A detent mechanism to prevent reverse rotation of wheel K upon the return of the advancing mechanism to its initial position includes a detent pawl 90 carried on a bracket 92 attached to the carriage. Detent pawl 90 is also biased by spring 94 and is associated with a switch 96 which controls the energization of the audio disc drive motor in a manner which will be described in greater detail below.

When the solenoid 84 is energized, the actuating link 82 is retracted inwardly and will rotate the indexing lever 70 about its pivot point to advance the cam wheel K by a radial distance equal to the center-to-center spacing between images 11. When the solenoid circuit is released, the indexing lever will rotate in the opposite direction and permit the drive pawl 70 to drop into an adjacent notch. At the same time, the detent pawl 90 holds the cam wheel against reverse rotation.

The optical projection system D comprises a lamp housing 100 extending forwardly in such a way as to separate the flexible audio disc 14 from image disc 10, the source of illumination provided within the housing in the form of an incandescent lamp 102 and an condensing lens 104. To project the light downwardly through the images, a prism or mirror 106 is supported in the lower portion of the lamp housing and is arranged to bend the light so that it is directed along an axis which is normal to the plane of the images. A conventional projection lens system 110 projects the image downwardly against a mirror 112 which throws the image onto the viewing screen M.

The audio pickup E comprises a pickup arm 120 having a cartridge 121 and A stylus 122 engageable with the record grooves 16. A platen 124 is provided for supporting the underside of the program unit to maintain the pickup in proper engagement with the audio disc.

With the carriage in the position shown in FIG. 7, the images located at the radially outermost portion of the image disc are in the path of the optical system for projection onto the screen. At the same time, the audio pickup is in position to engage the radially innermost record tracks on the audio disc. This position would correspond to the beginning of a program to be presented to the operator. As the cam wheel is rotated in intermittent fashion in the direction shown by the arrow in FIG. 8, the image disc will be advanced to present different images into the path of the optical system.

The drive mechanism H for the audio disc comprises an electrical motor 130 supported on a bracket 132 attached to a carriage 40. The driven shaft from the motor is coupled through a speed reduction unit 134, preferably comprising a series of friction discs, to the final drive disc 22 which engages the marginal edge 20 of the audio disc. In order to maintain the drive disc in tight engagement with the audio disc, said audio disc is pinched between the drive disc and an idler disc 138 (FIG. 10) which is carried on a hinged bracket 140 and biased downwardly by means of a spring 142. To remove the program unit, the bracket 140 is pivoted back to lift theider disc off the audio disc.

OPERATION

Referring back to FIG. 2, the control sequence for a system in which the program is manually advanced will now be described. The control circuit for the operation includes a multi-contact relay 150 which is actuated by solenoid 152. Relay solenoid 152 is energized through a circuit including the audio start switch 96 operated by the cam wheel notches 62, **62*a* and a switch 156 operated by movement of theprogram advance solenoid 84. The power supply 158 for audio disc drive means H is connected through contacts 160 of relay 150. The audio amplifier system F is controlled by the operation of contacts 162; and a holding circuit for the relay actuating solenoid 152 is provided by conductors 164, 165, a third set of relay contacts 166, and audio stop switch 168.**

As pointed out above, the notches 62, **62*a* on the periphery of cam wheel K control the operation of the audio start switch 96. When the indexing solenoid 84 is energized through manually actuated program advance switch 170, switch 156 is momentarily closed at the completion of the indexing stroke. This corresponds to a unique cam wheel position so that the detent pawl 90 will drop down into one of the deep notches 62*a*. This will cause switch 96 to close; and a circuit is completed through switch 156, switch 96 and the solenoid 152 to close all three contacts in relay 150. The audio stop switch 168, which is normally closed, rides against the periphery of the audio disc to complete the circuit through the audio rproduction system which includes the pickup, the amplifier, and the loudspeaker; and the drive motor is energized through contacts 160. Switch 168 completes a parallel circuit through the relay solenoid 152 so that when the indexing solenoid is de-energized to open switch 156, all of the contacts in the relay remain closed because of the continued energization of solenoid through contacts 166, audio stop switch 168, and conductors 164, 165. The audio disc then rotates one revolution until the audio stop switch is opened by dropping into the notch 24 on the periphery of the audio disc. This opens the holding circuit for the relay to de-energize solenoid 152** cutting of power to the audio reproduction system and the drive motor. The inertia of the audio disc will carry the notch on said disc past the location of the audio stop switch to re-close it and condition the unit for the next audio message.

Figures 10, 11:
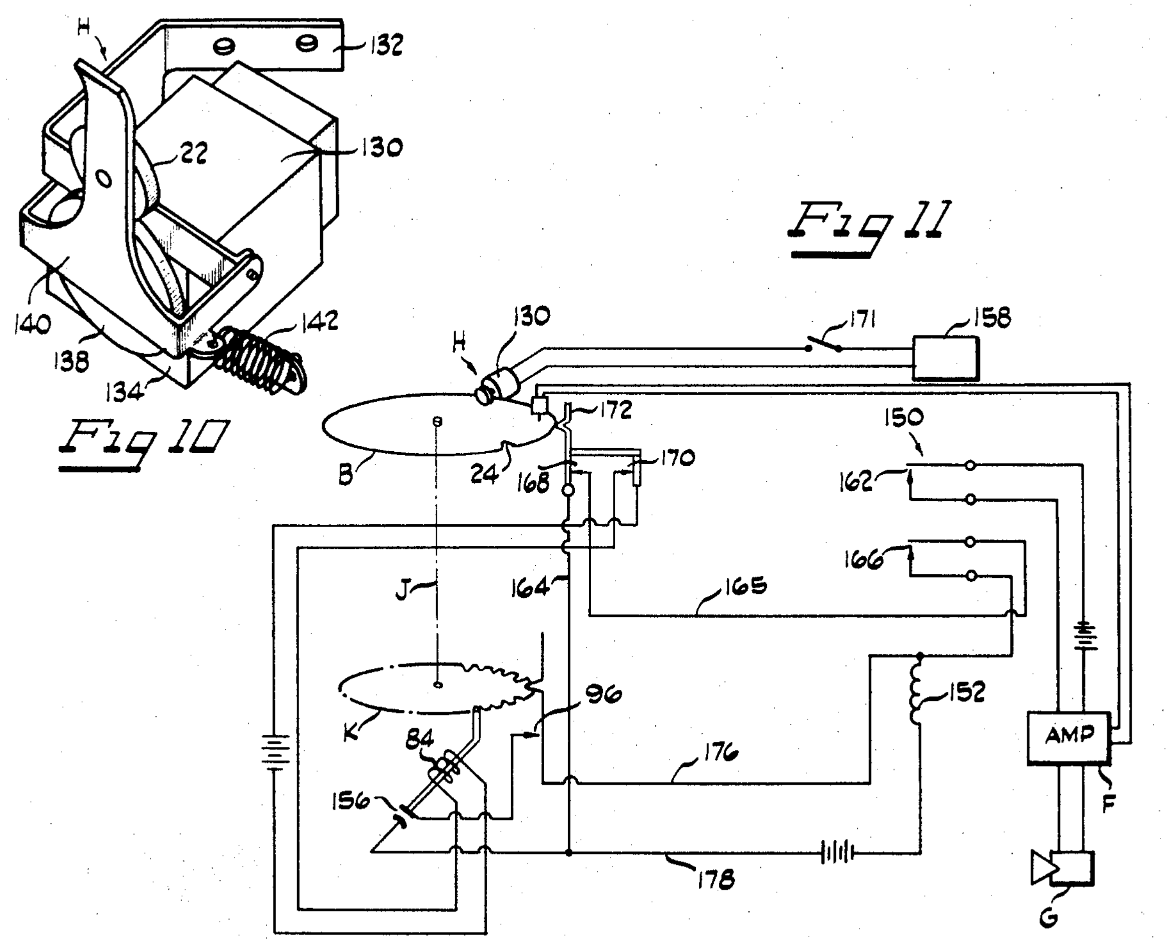
FIG. 10 is a detailed isometric illustration of the drive mechanism for the audio disc.
FIG. 11 is a schematic diagramillustrating the control circuit for an alternative embodiment of the invention in which the program is advanced automatically.

If it is desired to operate the audio-visual apparatus continuously rather than advancing the program manually, an automatic advance control scheme may be provided, such as shown in FIG. 11. In this modified control circuit, the audio disc drive motor 130, coupled to the power supply 158 through a main, on-off power switch 171, is driven continuously; and the program advance switch 170 is combined with the audio stop switch 168 to complete a circuit through the program advance solenoid 84 each time the audio disc makes one revolution.

switch actuating mechanism associated with the notches on the cam wheel K is residing in one of and contact 166, which is part of the relay holding circuit. The switches for the program advance solenoid and the audio stop circuit are both operated by an actuator 172 in response to the rotation of the audio disc B. i.e. by the notch 24 on the audio disc. Each time the audio disc makes a revolution, the follower on actuator 172 is dropped into the notch thereby closing contacts 170 to actuate solenoid 84 and open contacts 168 in the holding circuit. If an audio message is required for a particular image, the swtich actuating mechanism associated with the notches on the cam wheel K IS RESIDING IN ONE OF the deep notches 62*a* to close contacts 96. When the program advance solenoid 84 is actuated, it closes a circuit including switches 156 and 96 and conductors 176 and 178 through the relay solenoid 152. The relay will, upon actuation, close contacts 162 and 166, the former completing a circuit to supply power to the amplifier F and the latter closing the holding circuit rhrough switch 168 and conductors 164 and 165. When the notch 24 again reaches the point where it moves actuator 172, it will open contacts 168 to drop out the relay, and simultaneously close the other set of contacts 170 to complete the circuit through the program advance solenoid. If no message is required for the next image presented, the circuit will be open at contacts 96 so the image will remain in view until the audio disc makes another revolution.

In order to return the spindle J to its initial position when a program unit is removed, and thereby condition the unit for the substitution of a new program unit, an interlock between the cover 180 (FIG. 9) and the carriage 40 is incorporated into the unit. As shown best in FIG. 7, the cam follower 66 is carried on the end of a pin 182, which is movable up and down in a bushing 184 and normally biased upwardly by a spring 186. Inits operative position, the cam follower and pin are forced downwardly to position the follower in the cam track 65 by means of a lever 188 pivoted on the carriage support bracket 42. The other end of the lever is connected through a link 190 to the cover 180 such that when the cover is raised, the end of the lever holding down the cam follower pin is lifted to permit the spring to withdraw the cam follower from the cam track. When the cam roller is withdrawn, the entire carriage assembly is pulled back to its initial starting position by a return spring 192 connected to side wall 44.

In other modifications of the invention, the means for controlling the position of the audio pickup may be integrated into the program unit, as distinguished from the cam wheel K which is a part of the audio-visual apparatus. Moreover, since it should be apparent that absolute synchronization between the images and the audio record can be effected by positively controlling the position of a movable audio pickup relative to an audio disc supported on a fixed axis (rather than having the axis of the spindle and disc move relative to a stationary audio pickup), certain modified embodiments may include such a movable audio pickup.

Figure 12:
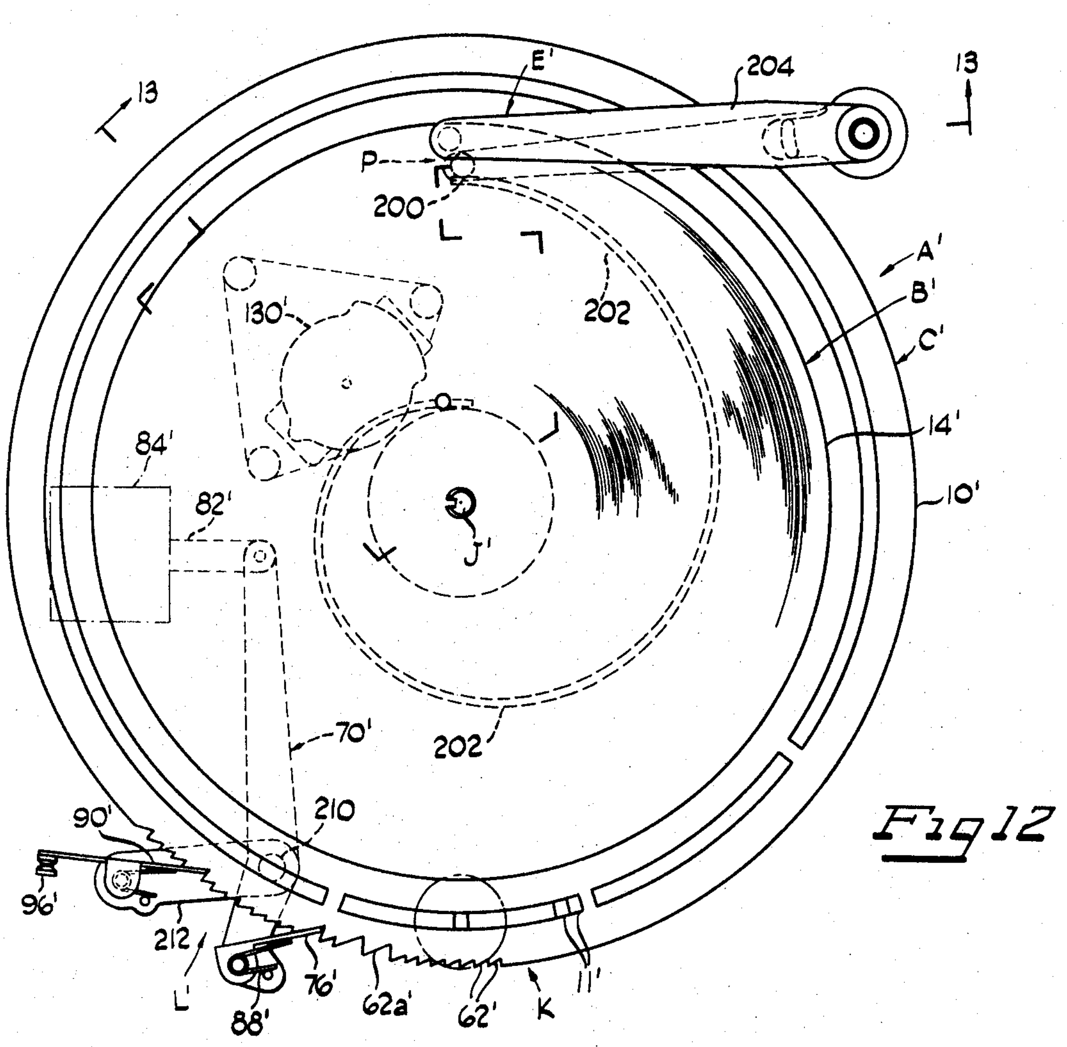
FIG. 12 is a top plan view of a program unit and turntable assembly for a modified embodiment of the present invention.

The first modified embodiment of the invention to be described is shown in FIGS. 12–15 inclusive. Where appropriate, primed reference characters will be used to designate elements corresponding to those in the first embodiment. Referring to FIG. 12, the program unit A′ comprises an audio component B′ in the form of audio record disc 14′ and a visual component C′ in the form of image disc 10′ which are adapted to be supported on a rotatable spindle J′. The audio pickup positioning mechanism P for assuring synchronization comprises a cam follower 200 which cooperates with a cam 202 on the underside of image disc 10′ to position a pivotally movable pickup arm 204 carrying the audio pickup cartridge and stylus 206. With the cam integrated into the program unit (rather than being part of the audio-visual device) the coordination of images and audio message can be varied in a more flexible manner. Thus, the cam track an d follower constitute a positioning mechanism which is responsive to the position of the visual component and is operative to move the phonograph record relative to the audio pick-up.

A more detailed showing of the cam 202 is illustrated in FIG. 14. It will be noted that, like the embodiment described in conjunction with FIGS. 1–11, the cam surface has a stepped spiral configuration. The cam surface 203 in engagement with the follower is formed on the outwardly facing side of a rib 204 with a plurality of discrete, constant radius arcuate segments 205*a*, 205*b*, etc. located at decreasing distances from the axis of rotation. Adjacent segments are connected by transition surfaces 207 which assure smoother movement of the follower from one segment to the next. The arcuate length of the individual segments (dimension $x$) determines the number of images between audio messages; while the radial displacement (dimension $y$) between adjacent segments is a function of the length of the audio message.

This particular embodiment affords substantially more flexibility in theprograming thereof, because the program unit can be manufactured such that any image can be furnished with a corresponding audio message; and the length of each audio message can be varied within rather wide limits. For a very short message, the audio disc can be driven for a partial revolution; and for a long message, the audio disc can be driven for several complete revolutions while maintaining the same image on the display screen. The control circuit for such a system will be described in greater detail below.

The image disc 10', like the cam wheel K in the first embodiment described, is provided with a plurality of notches or teeth 62', **62*a*' around its periphery which are used to (1) control the operation of the audio playback circuit by variations in the depth of said notches and (2) form a part of the program advance mechanism L' for intermittently rotating the image disc to bring different images into alignment with the optical system. The audio disc 14' and the image disc 10' are both formed as an integrated unit and are physically associated with each other by means of a fastener 30', similar to the bushing 30 shown in FIG. 5. Sine the audio disc is actually driven by the spindle, saia audio disc 14' is fixedly secured to the bushing while the image disc 10'** is free to rotate on an axially extending, cylindrical bearing surface provided by the bushing.

The program advance mechanism L' comprises a solenoid 84', and an actuating link 82' secured to a lever 70', the latter being pivoted at 210. One arm of the lever carries a drive pawl 76' which is biased by spring 88' into engagement with the notches on the periphery of the image disc. A detent pawl 90' carried by bracket 212 prevents reverse rotation 0f the image disc when the solenoid is deenergized. The detent pawl 90' also includes an audio start switch 96', the opening and closing of which is controlled by the depth of theparticular notches into which the detent pawl extends.

Figure 13:
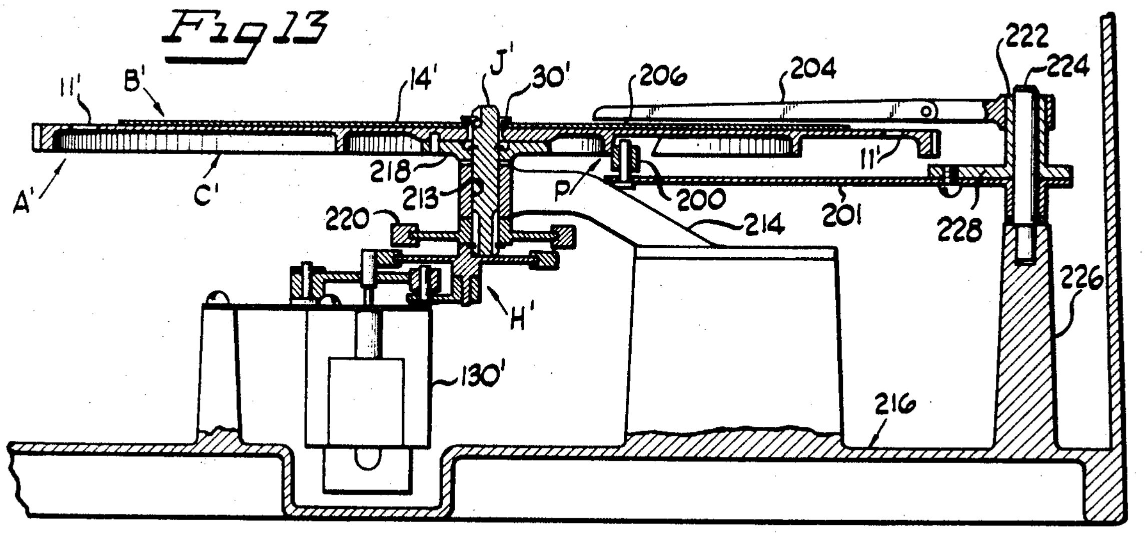
FIG. 13 is a cross-sectional view taken along the plane of line 13—13 of FIG. 12.

As best shown in FIG. 13, the spindle J' is supported in a bearing 213 in support 214 attached to base 216. A collar 218 separates the upper portion of the bearing and the image disc. The upper end of the spindle J' is splined or otherwise secured to the bushing 30' through which a drive connection is made to the audio disc 14'. The lower end of spindle J' extends downwardly through the bearing 213 and is connected to a final drive disc 220 of a speed reduction assembly driven by electric motor 130'. The pickup arm 204 is secured to a sleeve 222 which is pivotally mounted on a pin 224 carried on the upper end of a projection 226 of base 216. The sleeve 222 has a flanged portion 228 which is secured to the cam follower arm 201 which carries the cam follower 200 at one end thereof. The pickup arm and cam follower arm are thus movable together around the same axis and both are biased inwardly such that the cam follower 200 is always in firm engagement with the cam surface on the underside of the image disc. For any position of the image disc, there is a unique position for the cam follower and pickup arm to insure that the stylus is always positioned properly with respect to one of the record grooves on audio disc 14'.

FIG. 15 is a front elevation view of an audio-visual device incorporating the program unit of FIGS. 12 to 14. The relationship between the various components described in connection with the modified embodiment are illustrated as being arranged in a housing N' such that the spindle J' carries the program unit A' for rotational movement about a fixed axis. The optical system D' is located such that a lamp 102' directs light through the transparent images 11' upon mirrors 112' and 113' which reflect the image onto a viewing screen M' located in the front of the housing. The amplifier F' and speaker G' are also located within the confines of the housing.

Figures 16, 17, 18:
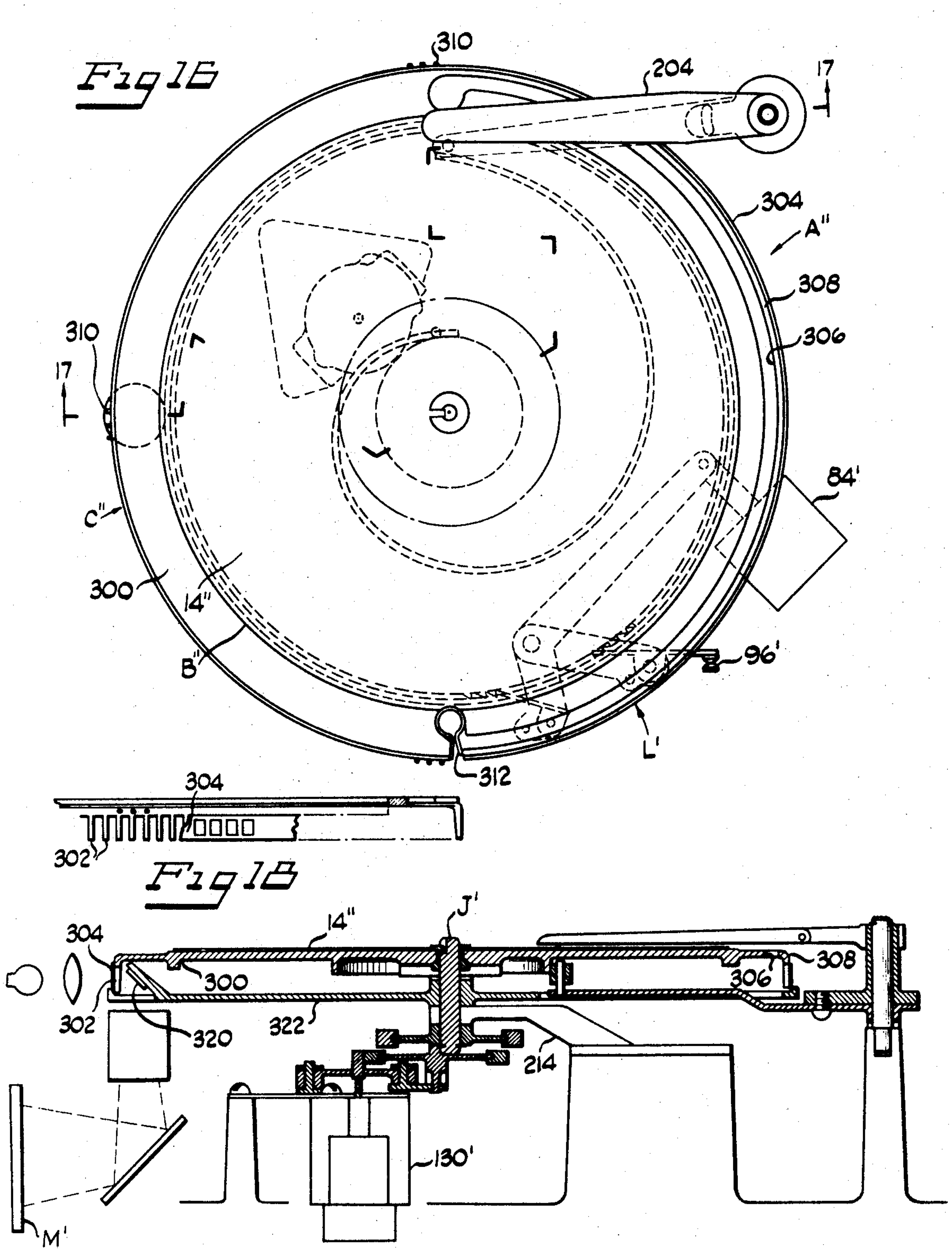
FIG. 16 is a plan view of a program unit and turntable assembly for still another modification of the invention.
FIG. 17 is a cross-sectional view taken along the plane of line 17—17 of FIG. 16.
FIG. 18 is a partial side elevation view illustrating the manner in which a film strip is supported on the periphery of the image disc.

In another modification of the invention, illustrated in FIGS. 16–18 inclusive, the program unit is constructed to permit the use of a continuous film strip for carrying the images. In almost every other detail, however, the apparatus is substantially identical to the modification illustrated in FIGS. 12–15.

The program unit A'' comprises a visual component C'' in the form of a disc 300 having a plurality of fingers 302 extending downwardly from the periphery thereof to support a film strip 304. Acircumferentially extending slot 306 is cut out of the disc to form a flexible section 308 which may be deformed inwardly to permit the film strip to be placed onto the disc and held by sprocket teth 310 at spaced locations around the periphery. After the film strip is in position, a small spring clip 312 biases the flexible section outwardly to stretch the film strip into tight engagement with the supporting fingers 302.

The audio component B'' is in the form of a disc 14'' and is interconnected with the image disc in the same manner previously described in the modification shown in FIGS. 12–15. The program advance mechanism and spindle drive are also the same as described above. Since the images are rotated in a path which is parallel to the axis of the spindle J'', the optical system includes a mirror 320 which is supported at about 45° with respect to the axis of spindle J''. The mirrir is carried on a fixed platform 322 which is supported by the cantilevered arm providing the bearing for spindle J''.

Figure 19:
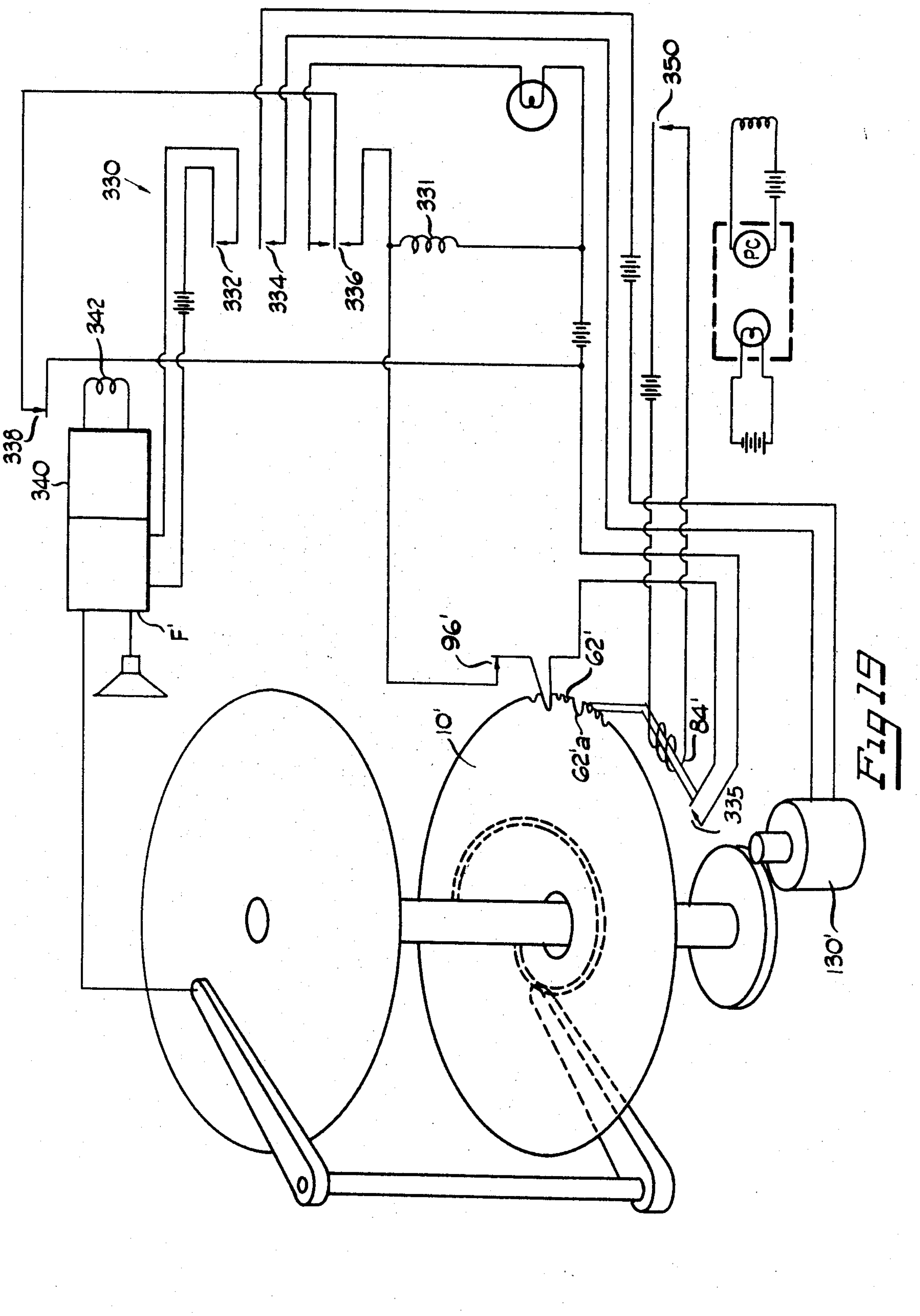
FIG. 19 is a schematic diagram of a control system which is adapted to be incorporated in either of the two embodiments shown in FIGS. 12–18.

FIG. 19 discloses a control circuit for the two modifications shown in FIGS. 12–15 and 16–18 respectively. The audio start-stop circuit is preferably controlled in response to a signal recorded directly on the audio disc in a manner well understood by those skilled in the art. Such a signal may be recorded in a frequency range which is not capable of being amplified through the audio amplification system and can be filtered through an appropriate frequency filtering circuit to energize a frequency responsive relay to cut off the audio. As shown in FIG. 19, the amplifier F' and the audio disc drive motor 130' are controlled by separate contacts in a multi-contact relay 330 actuated by a solenoid 331. Upon actuation of the program advance solenoid 84' by the manual closing of contacts 350, the switch 335 is closed momentarily at the end of the indexing stroke. If an audio message is to be played for the image, the actuator for the audio start switch rests in one of the deep notches **62*a*' along the periphery of the image disc 10' thereby closing switch 96'. This will complete a circuit through switch 335, the audio start switch 96', and relay solenoid 331. When relay 330 is actuated, contacts 332, 334, and 336 are closed, the latter completing a holding circuit through switch 338 in the audio stop circuit. The drive motor will be energized through a circuit including contacts 334 of relay 330 to drive the audio disc; and the signal from the audio pickup will be conducted to the amplifier for reproduction through the loudspeaker. When the stop signal on the audio disc is picked up, the signal is transmitted through the filter 340 to the audio stop circuit to energize the frequency responsive relay solenoid 342, opening switch 338 in the holding circuit and dropping out the main relay solenoid 331**. The relay then opens all of the circuits to the amplifier and the audio drive motor. If no message is to be played the actuator for switch 96' will drop into a shallow notch 62' and the momentary closing of switch 335 will not complete a circuit through relay solenoid 331.

While this invention has been described in connection with certain specific embodiments thereof, it is to be understood that this is by way of illustration and not by way of limitation; and the scope of the appended claims should be construed as broadly as theprior art will permit.

What is claimed is:

1. Audio -visual apparatus comprising support means for supporting an integrated program unit, said program unit having a visual component including a plurality of images arranged in a predetermined pattern and an audio component including a disc-type phonograph record having a plurality of individual messages recorded thereon, said recorded messeages corresponding to selected images and being arranged in spaced relation; means for driving said phonograph record about its central axis; indexing mechanism for selectively positioning said visual component to bring, in sequential fashion, individual images into view; an audio reproduction system including an audio pick-up and associated stylus adapted to be brought into operative relation with selected portions of said phonograph record and means for aurally reproducing the recorded messages corresponding to selected, individual images; and audio-visual synchronization means operated in response to movement of said visual component to effect controlled relative movement between said audio pick-up and said phonograph record to bring said audio pick-up into positively positioned, operative relation with a recorded message on said phonograph record corresponding to the image being viewed, said synchronization means including positioning means responsive to the position of said visual component mechanically linking said visual component with one of said audio pick-up and said phonograph record, said positioning means being adapted to provide a positive, irreversible, incremental relative movement between said phonograph record and said audio pick-up in response to a corresponding incremental movement of said visual component.

2. Apparatus as defined in claim 1 wherein said audio pick-up is stationary, and said support means is mounted for movement toward and away from said audio pick-up.

3. Apparatus as defined in claim 2 including a cam associated with said support means; and means operatively interconnecting said cam to said visual component, whereby movement of said visual component to effect a change in the image being viewed will produce a corresponding movement of said support means relative to said stationary audio pick-up.

4. Apparatus as defined in claim 1 wherein the axis of said support means is fixed, and said audio pick-up is mounted for movement toward and away from the said axis.

5. Apparatus as defined in claim 4 wherein said program unit includes a cam which is movable concurrently with said visual component, said synchronizing means including a cam follower engaging said cam and operatively connected to said movable audio pick-up.

6. Apparatus as defined in claim 1 wherein said visual component comprises a first disc supporting said images in the form of through-projection transparencies, said audio component comprising a flexible second disc with said recorded messages arranged in a generally concentric array; means for securing said first and second discs in closely spaced, parallel relation for independent rotation about a common axis; an image projection system including a light source, an optical system, and means for separating said flexible second disc from said first disc to provide a path for light from said light source through said transparencies.

7. Apparatus as defined in claim 1 wherein said visual component comprises a first disc supporting said images in the form of through-projection transparencies, said transparencies lying in the same plane as said disc and being circumferentially spaced around the marginal edge thereof; and wherein said audio component comprises a second disc in the form of an audio record which is substantially coextensive with and closely spaced to the central portion of said first disc in the region radially iwnard from said transparencies.

8. Apparatus as defined in claim 1 wherein said program unit comprises first and second discs, said first disc having a marginal edge provided with means for supporting said images in the form of light projectable transparencies, said transparencies being spaced circumferentially around said marginal edge in non-coplanar relation with respect to said disc, said second disc having said recorded messages arranged in a radially spaced, generally concentric array, said second disc overlying said first disc and being secured thereto in closely spaced relation for independent relative rotation about a common axis; means defining a cam surface operatively connected to said first disc; a cantilevered arm carrying said audio pick-up, said arm being pivotally supported; a pivotal support and a cam follower connected to said arm and engaging said cam surface whereby rotative movement of said first disc produces a corresponding pivotal movement of said arm to re-position said audio pick-up.

* * * * *